(12) United States Patent
Haik-Beraud et al.

(10) Patent No.: US 7,588,742 B2
(45) Date of Patent: Sep. 15, 2009

(54) PURIFICATION OF A MIXTURE OF $H_2$/CO BY CATALYSIS OF THE NOX

(75) Inventors: Natacha Haik-Beraud, Nogent sur Marne (FR); Serge Moreau, Velizy Villacoublay (FR); François Jantet, Amiens (FR); Audrey Moulin, Vincennes (FR)

(73) Assignee: L'Air Liquide, Societe Anonyme a Directorie et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 194 days.

(21) Appl. No.: 10/559,138

(22) PCT Filed: Jun. 10, 2004

(86) PCT No.: PCT/FR2004/001447

§ 371 (c)(1),
(2), (4) Date: Mar. 9, 2007

(87) PCT Pub. No.: WO2004/110924

PCT Pub. Date: Dec. 23, 2004

(65) Prior Publication Data

US 2007/0274891 A1  Nov. 29, 2007

(30) Foreign Application Priority Data

Jun. 11, 2003 (FR) .................................. 03 07006

(51) Int. Cl.
*C01B 3/50* (2006.01)
*C10K 1/20* (2006.01)

(52) U.S. Cl. .............. 423/239.1; 423/418.2; 423/648.1; 252/373

(58) Field of Classification Search .............. 423/239.1, 423/418.2, 648.1; 252/373
See application file for complete search history.

(56) References Cited

U.S. PATENT DOCUMENTS

| 3,564,816 | A | | 2/1971 | Batta |
| 4,117,081 | A | | 9/1978 | Inaba et al. |
| 4,320,100 | A | * | 3/1982 | Engelbrecht et al. ........ 423/219 |
| 5,792,436 | A | | 8/1998 | Feeley et al. |
| 6,425,939 | B1 | | 7/2002 | Moreau et al. |

FOREIGN PATENT DOCUMENTS

| DE | 24 33 479 | 1/1976 |
| EP | 1 095 701 | 5/2001 |

OTHER PUBLICATIONS

Database WPI, Section Ch, Week 200129, Derwent Publications Ltd., Class D15, AN 2001-281510 & WO 01 /19731, Mar. 22, 2001.

* cited by examiner

*Primary Examiner*—Timothy C Vanoy
(74) *Attorney, Agent, or Firm*—Elwood Haynes

(57) ABSTRACT

The invention relates to a method for purifying a gas flow containing hydrogen (H2) and carbon monoxide (CO), in addition to at least one nitrogen oxide (NOx), as impurities. According to said method, the gaseous flow is brought into contact with at least one catalyst containing copper and/or palladium, at a temperature between 100 DEG C. and 200 DEG C., in such a way as to eliminate at least part of the nitrogen oxide.

11 Claims, No Drawings

PURIFICATION OF A MIXTURE OF H₂/CO BY CATALYSIS OF THE NOX

The invention relates to a method for purifying gas mixtures, particularly gas mixtures mainly containing hydrogen and carbon monoxide, commonly called $H_2/CO$ mixtures or "syngas", and, optionally, methane ($CH_4$), which are polluted by impurities of the NOx type.

The $H_2/CO$ gas mixtures can be obtained in various ways, particularly:
- by reforming with steam or $CO_2$, by partial oxidation,
- by mixed methods, such as the ATR (Auto Thermal Reforming) method, which is a combination of steam reforming and partial oxidation, using gases such as methane or ethane, or
- by coal gasification or recovered as waste gases downstream of acetylene production plants.

The proportion of Co in these $H_2/CO$ mixtures varies according to the operating conditions typically between about 5 and 30% by volume. Moreover, besides the hydrogen and CO, the compounds $CH_4$, $CO_2$, and $H_2O$ are often comprised in the mixture, and in variable proportions.

At present, several alternatives are available for upgrading $H_2/CO$ mixtures, that is, particularly by producing:
- pure hydrogen, which has many applications,
- pure CO, which is used in particular for the synthesis of acetic acid and phosgene, which is a reaction intermediate in the production of polycarbonates, or
- an oxo-gas, which is a purified $H_2/CO$ mixture enriched with CO (>45% by volume) useable for the synthesis of butanol.

For this purpose, it is necessary first to purify the $H_2/CO$ mixtures.

However, it may also be necessary to purify the $H_2/CO$ mixtures for the needs of their downstream use, by means of specific reactions that can be carried out using specific catalysts and/or adsorbents for a particular impurity or by any other suitable chemical treatment.

Moreover, the removal of certain impurities present in the gas streams is difficult at the industrial level.

In fact, the catalytic reactions serving to remove the impurities must not cause the $H_2/CO$ gas mixture to be purified to react, or as little as possible.

The reactivity of $H_2/CO$ mixtures is well known.

Thus, the Fischer-Tropsch synthesis has been used for several years to obtain hydrocarbons by the following reaction mechanism (I):

$$(m/2+n)\ H_2 + n\ CO \rightarrow C_nH_m + n\ H_2O \quad (I)$$

A variant concerns the formation of methane, called methanation, as described by G. A. Mills et al, Catalysis Review, vol. 8, No. 2, 1973, p. 159 to 210, reflected by the following reaction (II):

$$CO + 3\ H_2 \rightarrow CH_4 + H_2O \quad (II)$$

Furthermore, carbon monoxide can also decompose by the following Boudouard reaction (III):

$$2\ CO \rightarrow C + CO_2 \quad (III)$$

In general, numerous metals can be used to catalyze the formation of hydrocarbons from CO and $H_2$. Examples include the following metals: Ru, Ir, Rh, Ni, Co, Os, Pt, Fe, Mo, Pd, or Ag as explained by F. Fischer, H. Tropsch and P. Dilthey, Brennst-Chem, vol. 6, 1925, p. 265.

The methanol formation reaction is also carried out on numerous metals, including copper:

$$CO + 2\ H_2 \rightarrow CH_3OH \quad (IV)$$

Thus, the ethylene hydrogenation catalysts that are commonly based on platinum deposited on alumina lead to a Fischer-Tropsch reaction (reaction (I) above) with the formation of hydrocarbons, particularly ethylene, which is found to be more concentrated at the reaction outlet than at the inlet, that is, in the gas before reaction.

Similarly, certain oxidation catalysts cause the formation of methanol that must then be removed downstream of the catalyst bed.

In other words, these supplementary reactions have the consequence of generating additional reaction products, not present in the initial gas to be purified, which must be removed by adsorption downstream, in addition to the virtually unavoidable pollutants present in the initial gas.

The undesirable impurities include nitrogen oxides commonly called NOx.

The NOx comprise the following compounds: $N_2O$, NO, $N_2O_3$, $NO_2$, $N_2O_5$. The latter three compounds are highly reactive and react spontaneously with reducing agents such as $H_2$ and CO, to form $N_2$, $CO_2$, and $H_2O$. NO and $N_2O$ species, which are more stable, may be present in the $H_2/CO$ mixture. If this mixture must be treated in a cold box (cryogenic distillation method), their presence incurs a potential danger. In fact, in the presence of traces of $O_2$ and unsaturated hydrocarbons, NOx can form products that are liable to accumulate in the cryogenic distillation units and damage these units. It is therefore indispensable to be able to remove them as efficiently as possible.

In other words, obtaining an efficient removal of nitrogen oxides, commonly called NOx, from the gas streams, in particular from the $H_2/CO$ streams, while limiting the production of undesirable by-products, is vitally important but not easy to achieve industrially.

The problem that arises is accordingly to produce and recover a gas stream, particularly of $H_2/CO$, stripped of most and preferably all of the NOx impurities it contains.

In other words, the goal of the invention is to improve the methods of the prior art for purifying gas mixtures, particularly of the $H_2/CO$ type, by proposing an efficient method for purifying an $H_2/CO$ mixture of the NOx impurities it contains, in order to prevent their concentration in the cryogenic distillation units.

The solution of the invention is accordingly a method for purifying a gas stream containing at least one nitrogen oxide (NOx) as impurities, in which the gas stream is contacted with at least one catalyst containing copper or palladium, at a temperature of between 100° C. and 200° C., in order to catalyze at least part of the nitrogen oxide.

Depending on each case, the method of the invention may comprise one or more of the following technical characteristics:
- the temperature is between 120° C. and 180° C. and/or the pressure is between 10 and 80 bar, preferably about 40 to 55 bar,
- the Gas Hourly Space Velocity is between 1000 and 10 000 $Sm^3/h$ of gas/$m^3$ of catalyst, preferably between 2000 and 6000 $Sm^3/h$ of gas/$m^3$ of catalyst (1 $Sm^3$=1 $m^3$ considered at 0° C. and 1 atm),
- the gas stream is contacted with the catalyst containing copper,
- the gas stream contains hydrogen ($H_2$) and carbon monoxide (CO), and optionally methane ($CH_4$),
- the nitrogen oxides are converted to water ($H_2O$), $O_2$, $NH_3$ and/or nitrogen,
- the water ($H_2O$) and NH3 resulting from the catalysis of the NOx are removed by means of one or more adsorption steps, at least one adsorption step is carried out using one or more adsorbents selected from the group formed by zeolites, exchanged or not, activated aluminas, silica gels, or mixtures or combinations thereof, the gas stream to be separated contains 10% by volume to 90% by volume of $H_2$, 10% by volume to 90% by volume of CO and optionally, methane, the catalyst may be protected by at least one protective bed located upstream of said catalyst. The protective bed serves to protect the catalyst from chemical species liable to be present in the gas, in addition to the nitrogen oxides, and liable to degrade or decrease the activity of the catalyst, for example mercury (Hg), arsenic ($AsH_3$), sulfur compounds ($H_2S$, thiols, thioethers), halogenated compounds (HBr, HCl, organic halides), HCN, iron carbonyl $Fe(CO)_5$ and nickel carbonyl $Ni(CO)_4$. The protective bed may comprise one or more adsorbents, for example the product PICATOX Cu/Ag from PICA, the catalyst used in the framework of the invention may be in the form of particles ranging from 0.20 to 1 cm in size.

The volume of catalyst to be used depends on the concentration of the impurities to be removed and the properties of the specific products.

The volumes of adsorbents and catalysts are given for guidance, because they depend on the concentration of the impurities to be removed and on the properties of the specific products. In general, it can be considered that for a given case, the quantity of adsorbent to be used is approximately proportional to the quantity of pollutant to be removed, while the quantity of catalyst is approximately proportional to the contact time or to the inverse of the Gas Hourly Space Velocity (GHSV) which is the volume of gas to be treated per hour, related to the volume of catalyst. The volume of gas can be related to the reactor inlet pressure (the GHSV then depends on the pressure), or can be expressed in defined conditions, at 1 bar and 0° C. for example (the GHSV then does not depend on the pressure); some leeway exists in the choice of the reference conditions appropriate to each application. The contact time and $GHSV^{-1}$ are only approximately proportional because the contact time, in addition to the pressure, depends on the temperature along the column, the variation of the number of moles during the reaction, and the pressure drop. However, for a given set of reaction conditions, the two parameters can be selected at will.

Another parameter to be taken into account is the content of impurities to be removed at the outlet of the gaseous effluents. On the whole, the lower the desired content, the higher the quantity of catalyst.

ILLUSTRATIVE EXAMPLE

To check the efficiency of the method of the invention, an $H_2$/CO gas mixture was contacted with catalysts according to the invention, that is, a copper (Cu) catalyst and a palladium (Pd) catalyst.

The copper-based catalyst was the product reference 0860T from Engelhard.

The palladium-based catalyst was the product reference 4586 from Engelhard.

In each test, the NOx were catalyzed at a pressure of 47 bar and a temperature of about 120 to 180° C.

The initial gas contained about 80% by volume of $H_2$ and CO, the remainder consisting particularly of methane and NOx impurities (about 0.15% by volume) to be removed.

During these tests, the space velocity adopted was 5000 to 2500 $Sm_3$/h/$m_3$ of catalyst (for example, 6 to 12 $m^3$ of catalyst to treat 30 000 $Sm^3$/h of gas).

TABLE

| | NOx contents of gas (in mole ppb) | | |
| --- | --- | --- | --- |
| Test No. | At reactor inlet | At outlet with Pd catalyst | At outlet with Cu catalyst |
| 1 | 398 | 21 | <10 |
| 2 | 1222 | 178 | <10 |
| 3 | 1175 | 184 | <10 |
| 4 | 3410 | 245 | <10 |
| 5 | 1049 | 170 | <10 |
| 6 | 1170 | 138 | <10 |
| 7 | 1317 | 100 | <10 |
| 8 | 1489 | 91 | <10 |
| 9 | 521 | 42 | <10 |
| 10 | 1889 | 60 | <10 |
| 11 | 882 | 20 | <10 |
| 12 | 962 | 71 | <10 |
| 13 | 2326 | 47 | <10 |
| 14 | 2736 | 59 | <10 |
| 15 | 1672 | 48 | <10 |
| 16 | 819 | 62 | <10 |
| 17 | 1225 | 171 | <10 |

The above table shows that the use of a copper or palladium catalyst is effective for catalyzing the NOx to reaction products such as $NH_3$, $N_2$, $O_2$ and $H_2O$, species that are easier to remove subsequently, or which raise no problem for the downstream unit.

The copper catalyst allows a more efficient removal of the NOx (residual quantity after purification <10 ppb on each test) than the palladium catalyst, as the catalytic activity of the latter may be slightly reduced if the CO content is high.

Despite this, on gas streams poor in CO but containing species of the diene type, it may be more advantageous to use a palladium catalyst than a copper catalyst, because palladium serves to convert the diene species, whereas copper does not achieve this as effectively.

The invention claimed is:

1. A method for purifying a gas stream containing hydrogen ($H_2$) and carbon monoxide (CO), and further containing at least one nitrogen oxide (NOx) as impurities, in which the gas stream is contacted with at least one catalyst containing copper and/or palladium, at a temperature of between 100° C. and 200° C., in order to remove at least part of the nitrogen oxide, wherein the catalyst is protected by at least one protective bed located upstream of said catalyst.

2. The method of claim 1, characterized in that the temperature is between 120° C. and 180° C. and/or the pressure is between 10 and 80 bar.

3. The method of claim 1, characterized in that the Gas Hourly Space Velocity (GHSV) is between 1000 and 10 000 $Sm^3$/h of gas/$m^3$ of catalyst.

4. The method of claim 1, characterized in that the gas stream is contacted with the catalyst containing copper.

5. The method of claim 1, characterized in that the gas stream contains hydrogen ($H_2$), carbon monoxide (CO), and methane ($CH_4$).

6. The method of claim 1, characterized in that the nitrogen oxides are converted to water ($H_2$), $O_2$, $NH_3$, and/or $N_2$.

7. The method of claim 6, characterized in that the water ($H_2$) and $NH_3$ resulting from the catalysis of the NOx are removed by means of one or more adsorption steps.

8. The method of claim 7, characterized in that at least one adsorption step is carried out using one or more adsorbents selected from the group formed by zeolites, exchanged or not, activated aluminas, silica gels, or mixtures or combinations thereof.

9. The method of claim 1, characterized in that the gas stream to be separated contains 10% by volume to 90% by volume of $H_2$, 10% by volume to 90% by volume of CO and, optionally, methane.

10. The method of claim 1, characterized in that the temperature is between 120° C. and 180° C. and/or the pressure is between about 20 to 50 bar.

11. The method of claim 1, characterized in that the Gas Hourly Space Velocity (GHSV) is between 2000 and 6000 $Sm^3/h$ of gas/$m^3$ of catalyst.

* * * * *

UNITED STATES PATENT AND TRADEMARK OFFICE
CERTIFICATE OF CORRECTION

PATENT NO. : 7,588,742 B2
APPLICATION NO. : 10/559138
DATED : September 15, 2009
INVENTOR(S) : N. Haik-Beraud et al.

It is certified that error appears in the above-identified patent and that said Letters Patent is hereby corrected as shown below:

In Column 4, line 59, replace the words "water ($H_2$)" with the words --water ($H_2O$)--.

In Column 4, line 61, replace the words "water ($H_2$)" with the words --water ($H_2O$)--.

Signed and Sealed this

Twenty-third Day of March, 2010

David J. Kappos
*Director of the United States Patent and Trademark Office*